United States Patent
Miyasato et al.

(10) Patent No.: US 7,519,264 B2
(45) Date of Patent: Apr. 14, 2009

(54) BROADCAST PROGRAM CONTENTS MENU CREATION APPARATUS AND METHOD

(75) Inventors: Hajime Miyasato, Tsurugashima (JP); Takeshi Nakamura, Tsurugashima (JP); Kouzou Morita, Tsurugashima (JP); Shinichi Gayama, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 909 days.

(21) Appl. No.: 10/841,470

(22) Filed: May 10, 2004

(65) Prior Publication Data
US 2004/0228616 A1 Nov. 18, 2004

(30) Foreign Application Priority Data
May 15, 2003 (JP) .............................. 2003-136908
Aug. 29, 2003 (JP) .............................. 2003-306780

(51) Int. Cl.
*G11B 27/00* (2006.01)
*H04N 5/91* (2006.01)

(52) U.S. Cl. .............................. 386/52; 386/46; 386/83; 345/902; 707/100; 707/102

(58) Field of Classification Search .................. 386/46, 386/52, 83, 95–98; 345/902; 707/5, 100–102; 715/501.1
See application file for complete search history.

(56) References Cited

U.S. PATENT DOCUMENTS 6,366,296 B1 * 4/2002 Boreczky et al. ............ 715/719
6,996,572 B1 * 2/2006 Chakrabarti et al. ........ 707/102
7,058,278 B2 * 6/2006 Murabayashi ................ 386/46

FOREIGN PATENT DOCUMENTS

JP 2001-076094 3/2001

OTHER PUBLICATIONS

G. Brown et al., "Automatic Content-Based Retrieval of Broadcast News." In Proc. ACM Multimedia 95, San Francisco, Nov. 1995.*

* cited by examiner

*Primary Examiner*—Thai Tran
*Assistant Examiner*—Mishawn Dunn
(74) *Attorney, Agent, or Firm*—Young & Thompson

(57) ABSTRACT

It is determined whether the broadcast program of the stored video signal is a broadcast program of a predetermined genre. A predetermined feature image portion of each of frames in the video signal of the broadcast program of the predetermined genre is detected from the stored video signal. Video data of only a feature image portion of a frame satisfying a predetermined appearance condition from the detected predetermined feature image portion is extracted. A video signal representing an image including a feature image portion represented by the video data is created and output as the menu, each time the video data is extracted.

18 Claims, 11 Drawing Sheets

| TELOP ID | APPEA-RANCE FRAME | DISAPPEA-RANCE FRAME | TELOP POSITION | | | | CHARACTER SIZE |
|---|---|---|---|---|---|---|---|
| | | | X1 | Y1 | X2 | Y2 | |
| 1 | 384 | 395 | 10 | 200 | 100 | 250 | 20 |
| 2 | 1027 | 1060 | 130 | 10 | 160 | 140 | 25 |
| 3 | 2538 | 2558 | 50 | 300 | 200 | 330 | 10 |
| ..... | | | | | | | |

BROADCAST PROGRAM CONTENTS MENU CREATION APPARATUS AND METHOD

BACKGROUND OF THE INVENTION

1. Field of the Invention

The present invention relates to a broadcast program contents menu creation apparatus which creates a menu indicating contents of a broadcast program such as a news program.

2. Related Art

In a video recording apparatus such as a hard disk recorder, broadcast programs are recorded over, for example, 24 hours. Later, the user can select an arbitrary program from among the recorded programs and view it.

If such a video recording apparatus has a function of displaying a menu which indicates broadcast contents as to a program, such as a news program, which changes in broadcast contents every day and which includes a plurality of items, it becomes possible for the user to select and view only interesting items in the program. The convenience in use of the video recording apparatus can be improved by leaps and bounds.

Heretofore, however, it has been considered that man's activity is inevitably needed to create and display a menu concerning contents of a broadcast program such as a news program and that automatic menu creation is impossible.

SUMMARY OF THE INVENTION

As for problems the present invention is to solve, the above-described problem can be mentioned as an example.

An object of the present invention is to provide a broadcast program contents menu creation apparatus, and method, for automatically creating a menu which represents contents of a broadcast program.

The above object of the present invention can be achieved by a broadcast program contents menu creation apparatus which creates a menu concerning contents of a broadcast program provided with: a storage device which stores a video signal of a broadcast program; a genre decision device which makes a decision whether the broadcast program having a video signal stored in the storage device is a broadcast program of a predetermined genre; a feature image detection device which detects a predetermined feature image portion of each of frames in the video signal of the broadcast program of the predetermined genre from the video signal stored in the storage device; a video extraction device which extracts video data of only a feature image portion of a frame satisfying a predetermined appearance condition from the predetermined feature image portion detected by the feature image detection device; and a menu creation device which creates and outputs a video signal representing an image including a feature image portion represented by video data as the menu, each time video data is extracted by the video extraction device.

The above object of the present invention can be achieved by a broadcast program contents menu creation method which creates a menu concerning contents of a broadcast program, provided with processes of: storing a video signal of a broadcast program; determining whether the broadcast program of the stored video signal is a broadcast program of a predetermined genre; detecting a predetermined feature image portion of each of frames in the video signal of the broadcast program of the predetermined genre from the stored video signal; extracting video data of only a feature image portion of a frame satisfying a predetermined appearance condition from the detected predetermined feature image portion; and creating and outputting a video signal representing an image including a feature image portion represented by the video data as the menu, each time the video data is extracted.

BRIEF DESCRIPTION OF THE DRAWINGS

FIG. 9 is a diagram showing a method for setting thresholds which divides a luminance histogram into luminance regions.

DESCRIPTION OF THE PREFERRED EMBODIMENTS

Hereafter, embodiments of the present invention will be described in detail with reference to the drawings.

Figure 1:
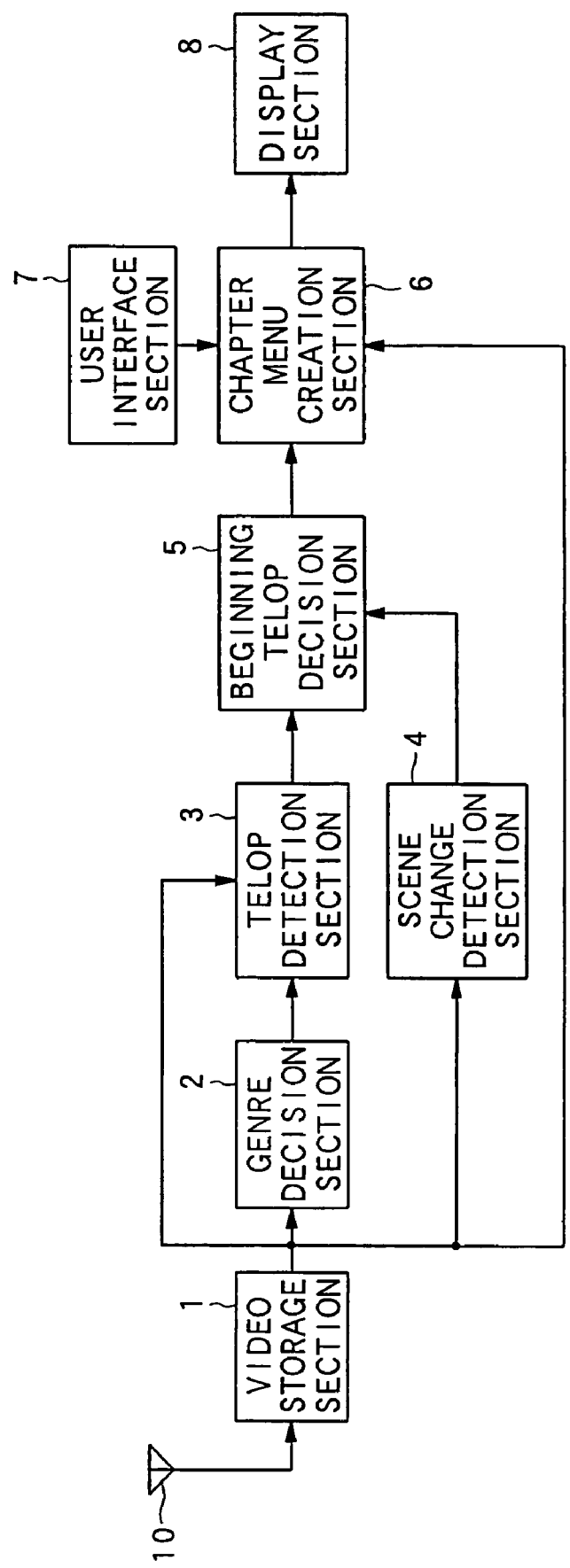
FIG. 1 is a block diagram showing a news program contents menu creation apparatus according to the present invention.

FIG. 1 shows a news program contents menu creation apparatus according to the present invention. This news program contents menu creation apparatus includes a video storage section 1, a genre decision section 2, a telop detection section 3, a scene change detection section 4, a beginning telop decision section 5, a chapter menu creation section 6, a user interface section 7 and a display section 8.

The video storage section 1 receives an arbitrary television broadcast wave via an antenna 10, demodulates the received signal, obtains at least a video signal (in some cases, an audio signal) and stores the video signal internally. Furthermore, the video storage section 1 extracts program information such as the EPG (electronic program guide) included in a television broadcast wave or a different broadcast wave, and stores the extracted program information as data. The video storage section 1 includes, for example, a hard disk drive. By using the above-described program information, the genre decision section 2 judges a genre of a program represented by a video signal stored in the video storage section 1.

By using a luminance signal of the video signal stored in the video storage section 1, the telop detection section 3 detects telop information, such as a position of a telop appearing in the program represented by the video signal, its character size, and a frame including the telop. The telop detection section 3 may be supplied from the genre decision section 2 with a video signal judged to be a news program by the genre decision section 2. Alternatively the telop detection section 3 may take in a video signal judged to be a news program by the genre decision section 2, from the video storage section 1.

By using the luminance signal of the video signal stored in the video storage section 1, the scene change detection section 4 detects a point in time (a gap between scenes) at which a scene in a program represented by a video signal changes, as scene change information.

The beginning telop decision section 5 judges the beginning telop of a news program according to the telop information detected by the telop detection section 3 and the scene change information detected by the scene change detection section 4. "The beginning telop" means a telop indicating a header of news which appears in the first scene of each news item in the news program. The beginning telop decision section 5 also extracts the beginning telop judged by the beginning telop decision section 5, from a frame including the telop in the telop information as image data.

By using the image data of the beginning telop extracted by the beginning telop decision section 5, the chapter menu creation section 6 creates a chapter menu of the news program. The chapter menu creation section 6 mixes a video signal including the chapter menu with a video signal corresponding to a telop stored in the video storage section 1, and outputs a resultant video signal to the display section 8.

The user interface section 7 is an operation section for selecting an item (contracted telop) in the chapter menu displayed on a monitor screen of the display section 8. The user interface section 7 can be operated by the user.

If it is detected by the genre decision section 2 in the news program contents menu creation apparatus having such a configuration that a program genre in the video signal stored in the video storage section 1 is news, a detection signal is supplied to the telop detection section 3.

In response to the detection signal, the telop detection section 3 detects telop information in the video signal stored in the video storage section 1, i.e., in the video signal of the news program. For example, by detecting an intra-frame edge or an inter-frame edge in the video signal, the telop detection section detects a telop. The intra-frame edge is a portion where a luminance difference between adjacent pixels in the frame is high. The inter-frame edge is a portion where edges exist in the same pixel portion, when intra-edges are compared between adjacent frames. Here, edges are portions which form edges of one video piece in the screen.

Figure 2:
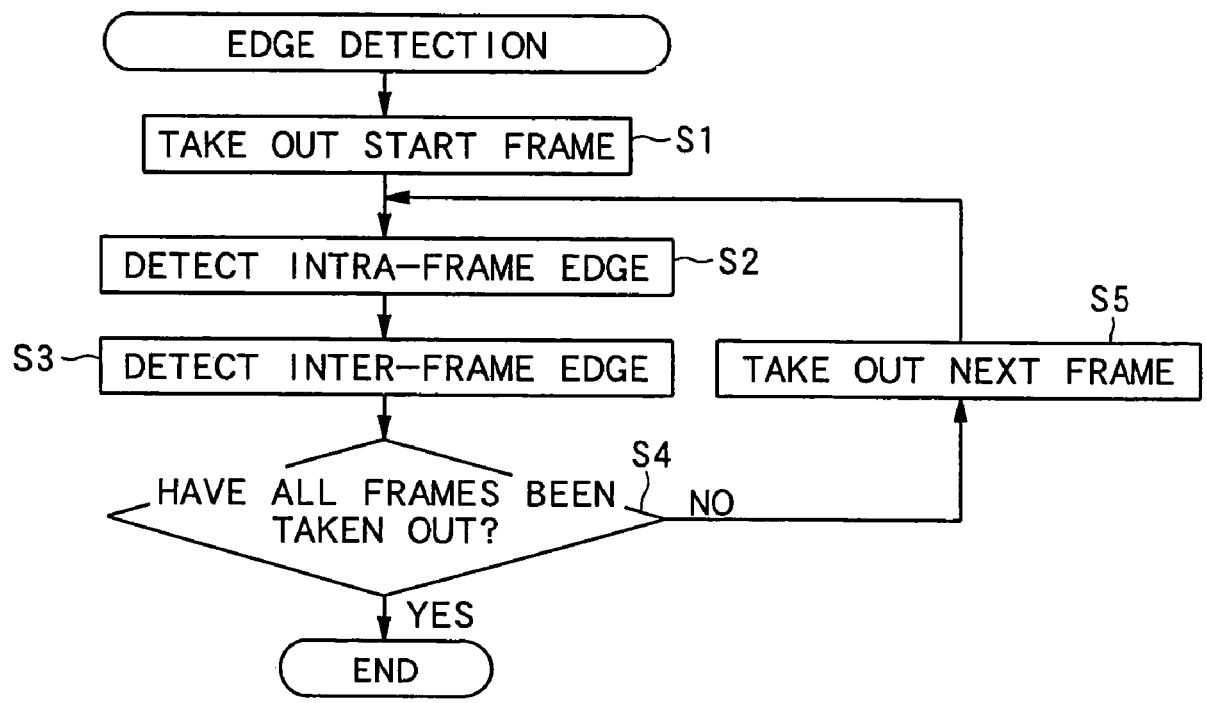
FIG. 2 is a flow chart showing an edge detection operation.

In edge detection, the telop detection section 3 first takes out a start frame of one news program from the video signal stored in the video storage section 1 as shown in FIG. 2 (step S1). An intra-frame edge in the latest frame taken out is detected (step S2). An inter-frame edge of the latest frame and an immediately preceding frame is detected (step S3). If the latest frame is the start frame, the step S3 is disregarded. After execution of the step S3, it is determined whether all frames of the news program have been taken out from the video storage section 1 (step S4). If all frames have not been taken out, then the next frame is taken out from the video storage section 1 (step S5) and the telop detection section 3 returns to the step S2. Thus, detections of the intra-frame edge and of the inter-frame edge are conducted.

Figure 3:
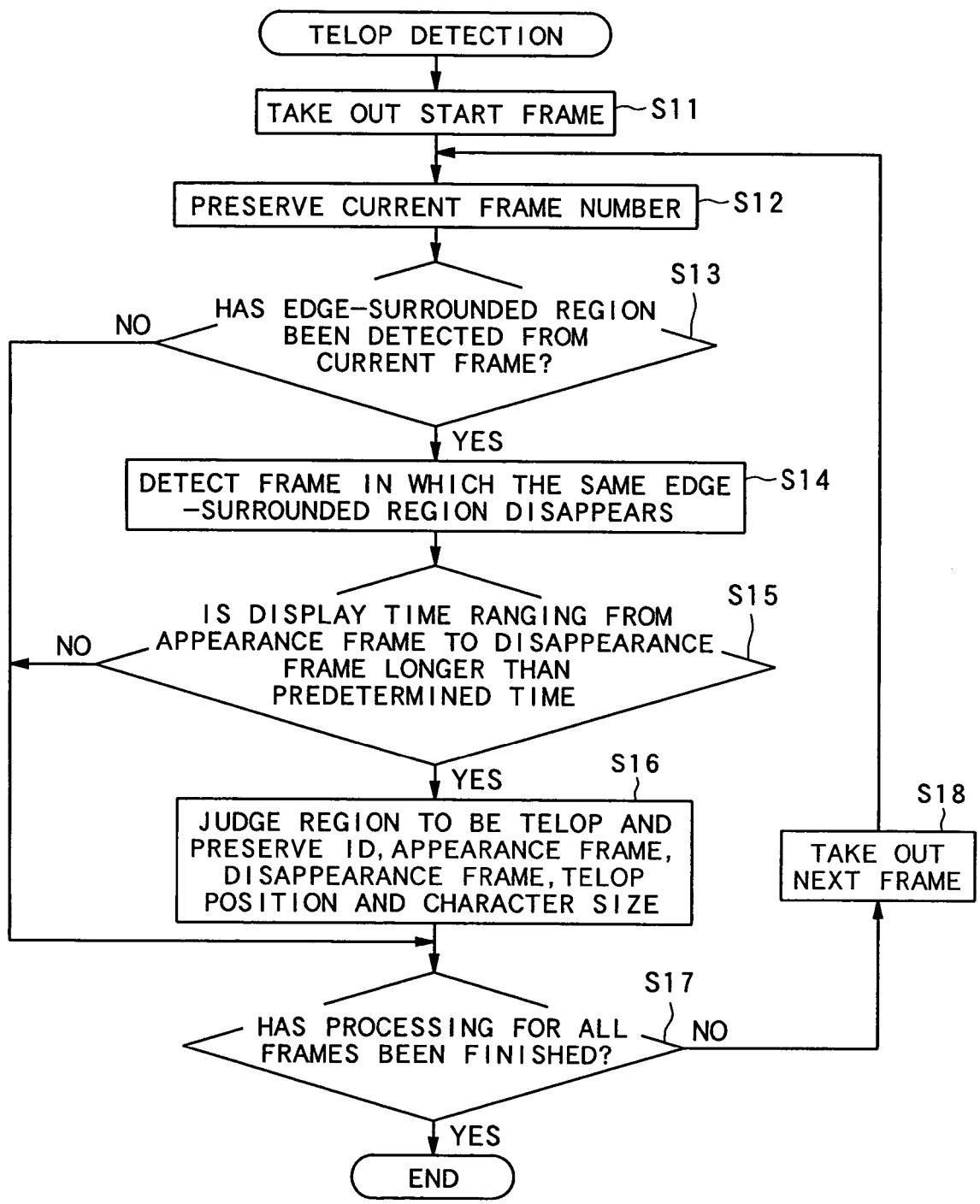
FIG. 3 is a flow chart showing a telop detection operation.

If all frames have been taken out, telop detection operation is conducted to obtain telop information from all edge detection contents. As shown in FIG. 3, a start frame of the news program is taken out from the video signal stored in the video storage section 1 (step S11). The start frame at the step S11 is the oldest frame in time among the frames having detected edges. A frame number of the start frame is preserved (step S12). It is determined whether a region surrounded by edges is detected from the current frame (step S13). If a region surrounded by edges, i.e., an edge-surrounded region is detected, then a frame which is subsequent to the current frame and in which edges in the same region as the edge-surrounded region in the current frame disappear is detected (step S14). It is determined whether a display time ranging from the edge-surrounded region appearance frame to the edge-surrounded region disappearance frame is longer than a predetermined time (step S15). If the display time of the edge-surrounded region is judged to be longer than the predetermined time, then the edge-surrounded region is regarded as a telop region, and its ID (number), its appearance frame, its disappearance frame, a telop position, and its character size in its frame are preserved (step S16). At the step S16, the inside of the telop region is scanned to detect the character size. For detection of the character size, a known character string information extraction method can be used. See, for example, Japanese Patent Application Laid-Open Publication No. 2001-76094.

Figures 4, 5:
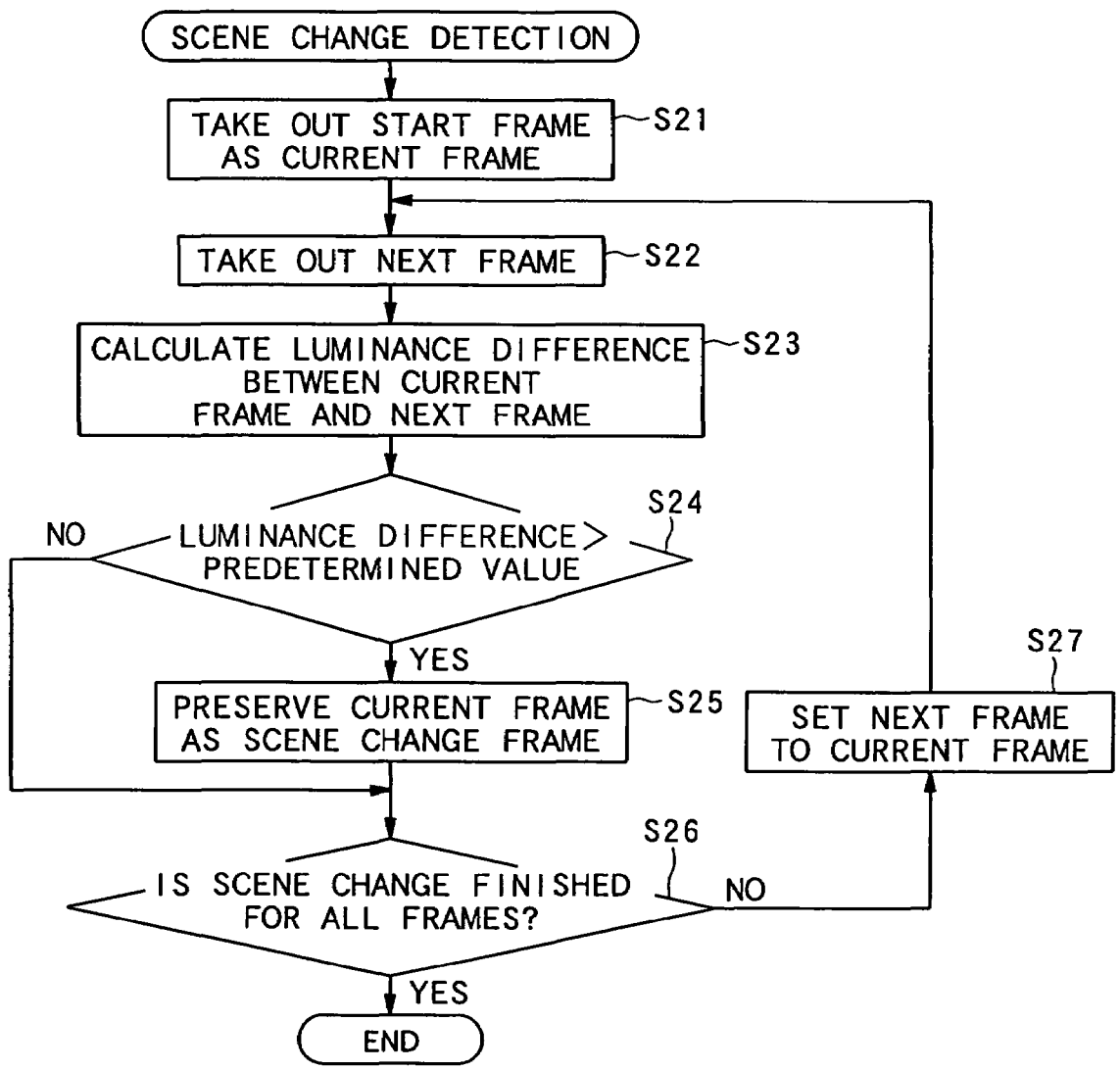
FIG. 4 is a diagram showing a data table of telop information.
FIG. 5 is a flow chart showing a scene change detection operation.

As shown in FIG. 4, the telop information preserved at the step S16 is written into an internal memory (not illustrated) every telop as a data table including the ID, the appearance frame, the disappearance frame, the telop position and the character size of the telop. Here, each telop takes the shape of a rectangle, which is a typical shape. X1 and Y1 in the telop position represent coordinates of the left upper corner of the telop, and X2 and Y2 represent coordinates of the right lower corner of the telop. By the way, since the telop shape is not rectangular in some cases, the telop information needs to include its shape in that case.

After the execution of the step S16, it is determined whether all frames having edges detected have been taken out from the video storage section 1 (step S17). If all frames have not been taken out, the next frame having detected edges is taken out (step S18) and the processing is returned to the step S12 to repeat the above-described telop region decision.

In order to detect a point in time at which the scene of a news program represented by a video signal changes in response to the above-described detection signal, the scene change detection section 4 conducts operation as shown in FIG. 5. First, the scene change detection section 4 takes out a start frame of the news program from the video signal stored in the video storage section 1 (step S21). The next frame to the current frame taken out is taken out (step S22). A difference between the sum total value of luminance values of all pixels in the current frame and the sum total of luminance values of all pixels in the next frame, i.e., a luminance difference is calculated (step S23). It is determined whether the luminance difference is greater than a predetermined value (step S24). If the luminance difference is greater than the predetermined value, the current frame is preserved as a frame of a scene change where the scene changes (step S25).

After execution of the step S25, it is determined whether all frames have been taken out from the video storage section 1 (step S26). If all frames have not been taken out, the next frame is set to the current frame (step S27). Thereafter, the processing returns to the step S22, where a next frame is taken out from the video storage section 1 and the above-described scene change detection operation is repeated.

If the telop information and the scene change information are thus detected, the beginning telop decision section 5 makes a decision on a beginning telop of the news program on the basis of the information. For the decision on the beginning telop, the following four conditions are determined.

(a) Character sizes are comparatively large, and are nearly constant for respective news items.

(b) The beginning telop appears a plurality of times in one news program.

(c) The beginning telop is disposed in the same position nearly every time.

(d) Between the appearance and disappearance of the beginning telop, there are no scene changes.

The beginning telop decision section 5 conducts the following telop decision operation in order to extract a telop which satisfies all of the conditions (a) to (d).

Figure 6:
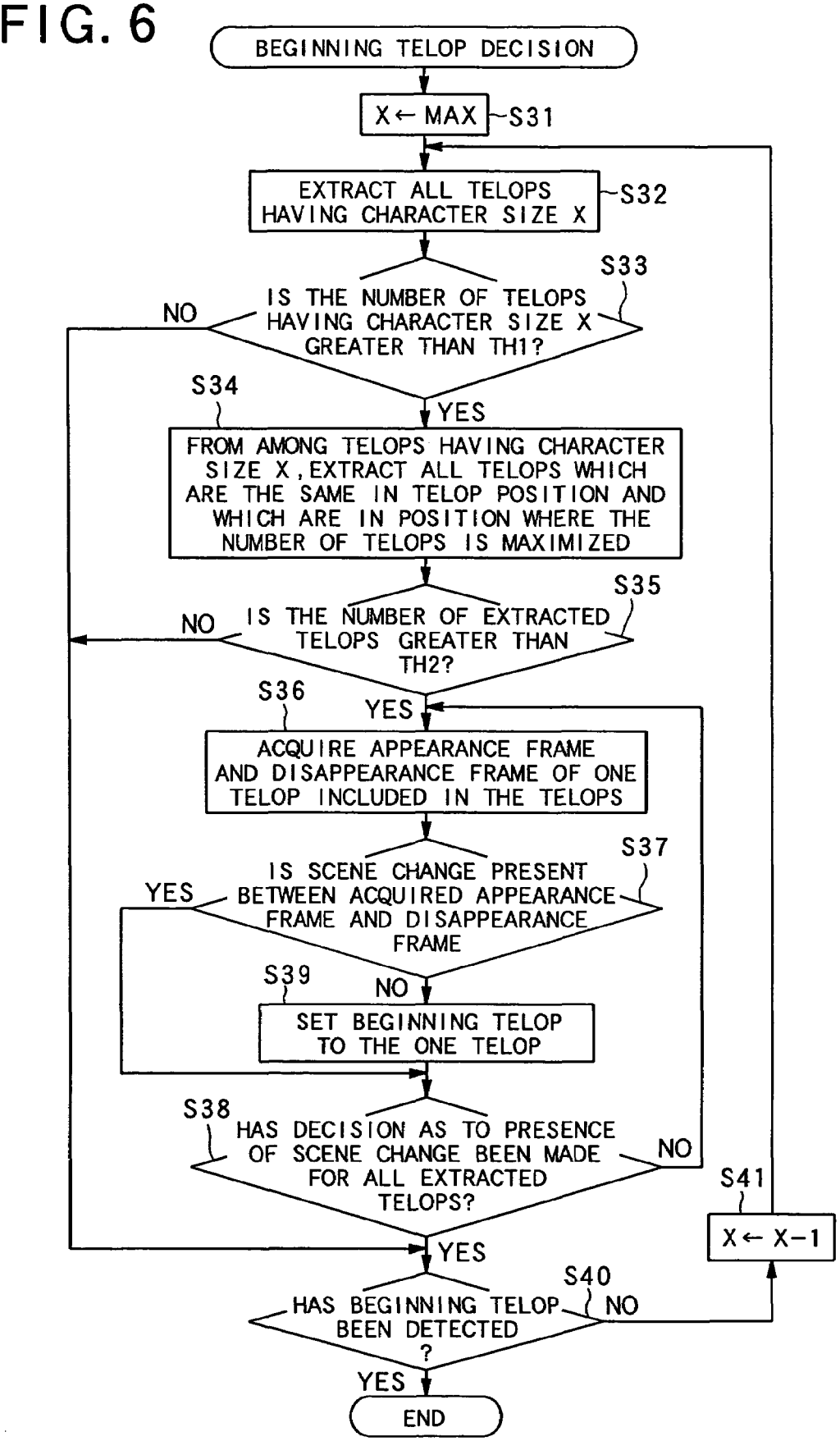
FIG. 6 is a flow chart showing a beginning telop decision operation.

In the beginning telop decision operation, first a character size X is set equal to a maximum value MAX (step S31) as shown in FIG. 6, and all telops having the character size X are extracted from the telop information detected by the telop detection section 3 (step S32). It is determined whether the number of telops having the character size X is greater than a first predetermined number TH1 (step S33). If the number of telops having the character size X is greater than the first predetermined number TH1, the above described conditions (a) and (b) are satisfied. In this case, from among the telops having the character size X, all telops which are the same in telop position and which are in a position where the number of telops is maximized are extracted (step S34). It is determined whether the number of extracted telops is greater than a second predetermined number TH2 (step S35).

If the number of the extracted telops is greater than the second predetermined number TH2, it means that the condition (c) is satisfied and an appearance frame and a disappearance frame of one telop included in those telops are acquired (step S36). The appearance frame and the disappearance frame of one telop can be read out from the data table and then can be obtained. After execution of the step S36, it is determined whether a scene change is present between an appearance frame and a disappearance frame of one telop (step S37). If a scene change is present between the appearance frame and the disappearance frame of one telop, it is determined whether the decision concerning the presence of the scene change has been finished for all telops extracted at the step S34 (step S38). When the decision is not finished, the processing is returned to the step S36, where an appearance frame and a disappearance frame of one of the remaining telops are acquired.

If a scene change is not present between the appearance frame and the disappearance frame of one telop, it means that the condition (d) is satisfied and the beginning telop is set to the one telop (step S39). Thereafter, the step S38 is executed.

If the decision as to the presence of the scene change is judged to have been finished for all telops at the step 38, it is determined whether a beginning telop has been detected (step S40). In other words, it is determined whether the step S39 has been executed. If the number of telops having the character size X is judged at the step S33 to be equal to or less than the first predetermined number TH1, or if the number of telops is judged at the step S35 to be equal to or less than the second predetermined number TH2, the processing at the step S40 is immediately executed.

If a beginning telop has not been detected, the character size X is decreased by one and the processing is returned to the step S32 where the above-described operation is repeated. In other words, the character size is decreased by one size and the beginning telop detection is conducted in the same way. On the other hand, if a beginning telop has already been detected, then an image portion (image data) of the beginning telop determined at the step S39 and the beginning telop information indicating the frame number are output to the chapter menu creation section 6 (step S41); and the beginning telop decision operation is finished. The frame number of the beginning telop information is the number of the appearance frame including the beginning telop.

As for the character size and position of the beginning telop, there is a possibility that an error of some degree occurs according to the nature of the character and the reception situation. Therefore, the coincidence condition on the character size and the position may be relaxed.

The chapter menu creation section 6 creates a chapter menu of a news program according to the beginning telop information supplied from the beginning telop decision section 5. Each time one piece of the beginning telop information is supplied, one item of the chapter menu is added and formed in the beginning telop image. The one item of the chapter menu represents an outline or a title concerning one news item. Respective items are displayed on the monitor of the display section 8 in a contracted image form of the beginning telop video image. The chapter menu is displayed on the monitor as represented by a symbol A in FIG. 7.

The user selects a desired item from among a plurality of items (represented by a symbol B in FIG. 7) in the chapter menu displayed on the monitor via the user interface section 7. By using a frame number of the beginning telop information corresponding to the selected item, the chapter menu creation section 6 reads out the video signal beginning with the frame number over a predetermined interval from the video storage section 1, mixes the video signal with a video signal of the chapter menu, and supplies a resultant signal to the display section 8. In the display example shown in FIG. 7, an image (symbol C) concerning the selected item "Shuttle launching has succeeded" is displayed on the monitor screen of the display section 8. The predetermined interval over which the contents of the selected item are displayed on the monitor as a video image may be an interval over which the beginning telop is displayed (an interval ranging from the appearance frame to the disappearance frame), or may be a constant interval irrespective thereof.

EMBODIMENTS

Figure 8:
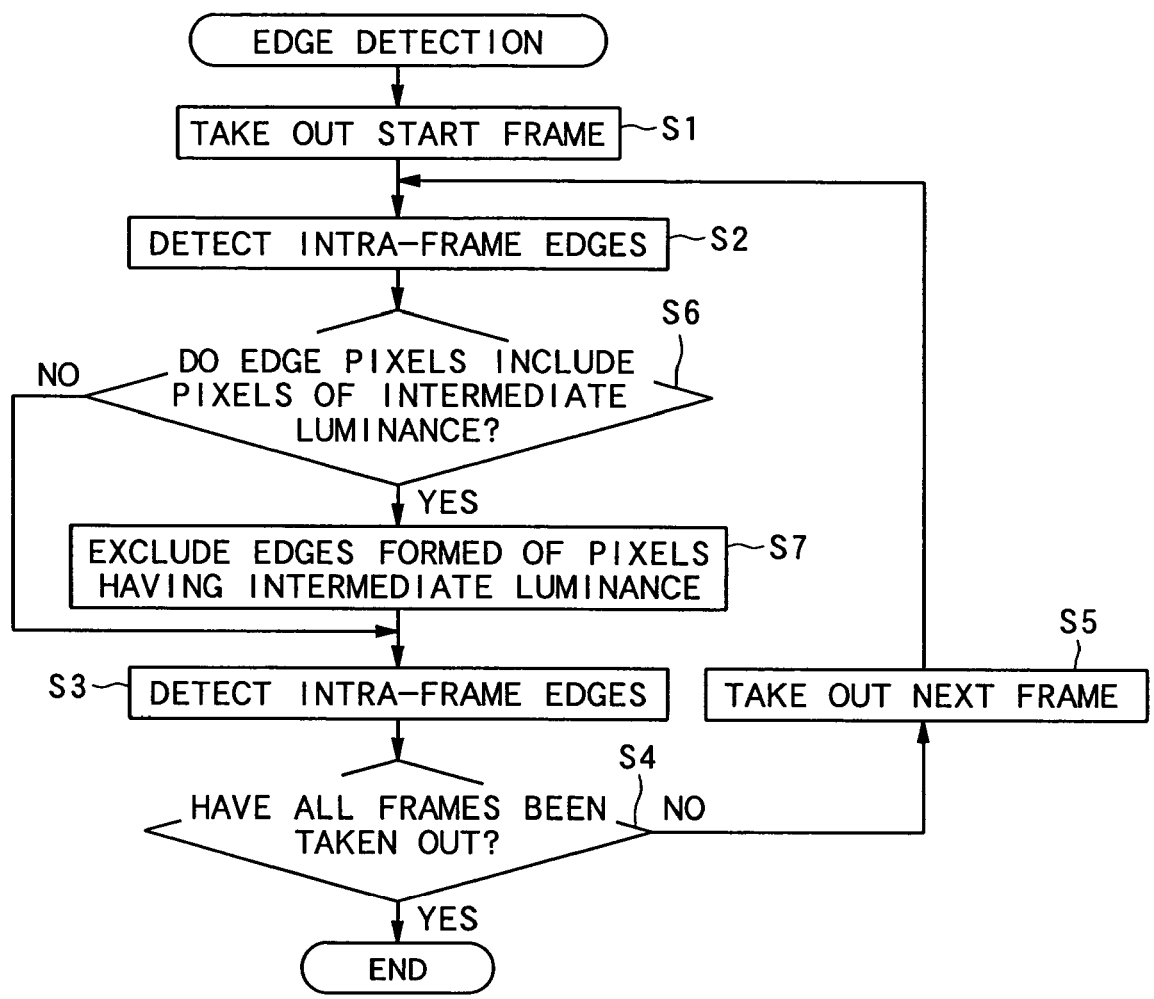
FIG. 8 is a flow chart showing an edge detection operation as another embodiment of the present invention.

In order to improve the precision of the decision on the beginning telop conducted by the beginning telop decision section 5, pixels having intermediate luminance may be omitted at the time of edge detection conducted by the telop detection section 3. In other words, in the edge detection, the telop detection section 3 detects edges in the current frame taken at the step S2 as shown in FIG. 8, and thereafter determines whether edge pixels include pixels having intermediate luminance (step S6). In the case of an edge having intermediate luminance, the edge is removed and edges having luminance other than the intermediate luminance, i.e., edges having high luminance or low luminance are left (step S7). Thereafter, the processing proceeds to the step S3. Other steps in the edge operation are the same as those shown in FIG. 2.

The reason why pixels having intermediate luminance are excluded at the time of edge detection is that pixels forming a telop include many pixels of high luminance or low luminance and few pixels having intermediate luminance. At the step S6, a luminance histogram of edge pixels is created and two thresholds are set in order to divide the edge pixels into three luminance regions, i.e., a high luminance region, a low luminance region and an intermediate luminance region according to the histogram. By using the thresholds, it is determined whether an edge pixel has intermediate luminance.

As a method for setting thresholds in order to divide a luminance histogram into a plurality of luminance regions, the Otsu's method is known. See, for example, "Image analysis handbook", University of Tokyo Press, pp. 502-504.

Figure 9A:
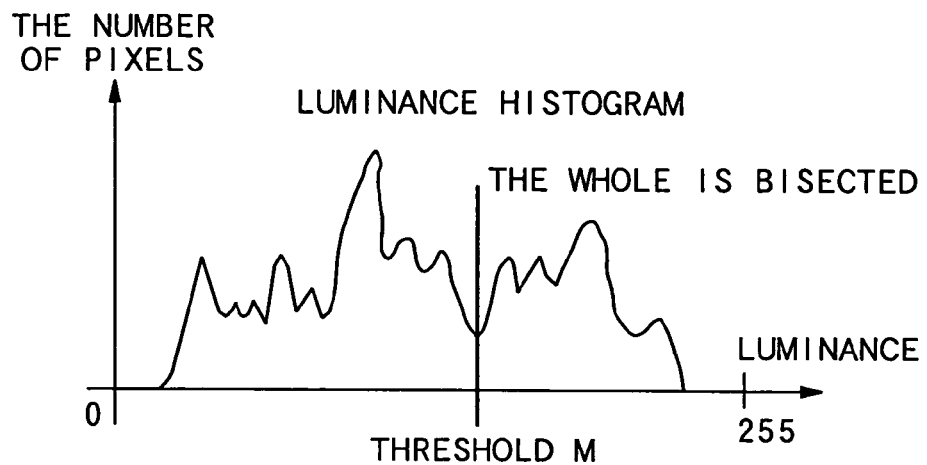
FIG. 9A is a diagram showing that a threshold M is obtained by bisecting the whole luminance histogram.
Figure 9B:
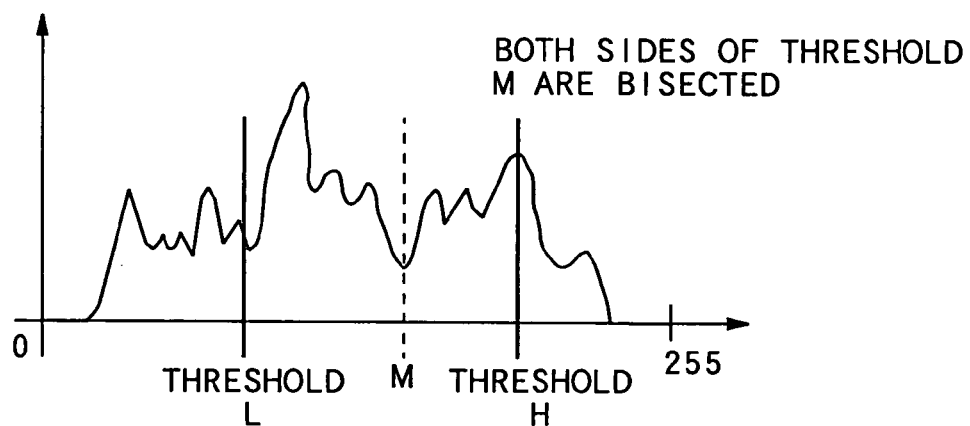
FIG. 9B is a diagram showing that thresholds L and H are obtained.
Figure 9C:
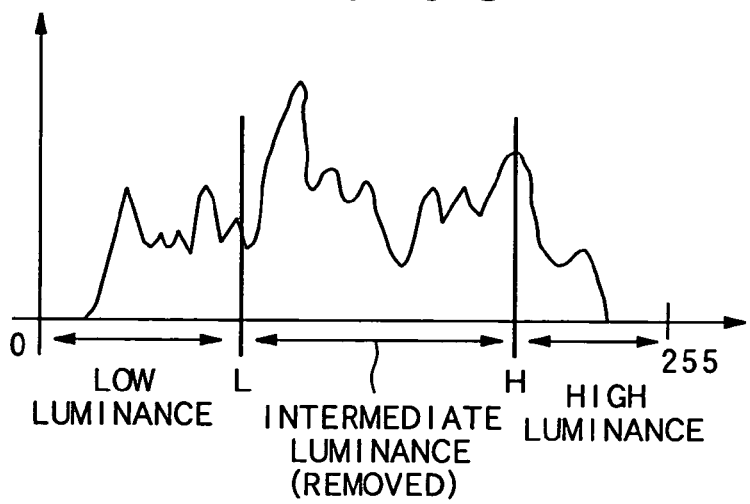
FIG. 9C is a diagram showing that the luminance histogram is divided into three luminance regions.

By using the Otsu's method, first, as shown in FIG. 9A, a threshold M is obtained by bisecting the whole luminance histogram. Subsequently, as shown in FIG. 9B, by bisecting a low luminance region having low luminance lower than the threshold M and bisecting a high luminance region higher than the threshold M, thresholds L and H are obtained. As shown in FIG. 9C, by the thresholds L and H, the luminance histogram is divided into three luminance regions, i.e., a high luminance region, a low luminance region and an intermediate luminance region.

In setting the threshold for the bisection, first, M is set as a certain value in luminance and M is defined as the threshold when the "dissemination" of the luminance histogram for M becomes the minimum. Specifically, supposing that the luminance histogram is formed of N pixels and each pixel has luminance of $LUM_i$ ($1 \leq i \leq N$), $$\sum_{i=1}^{N} (M - LUM_i)^2$$

is calculated. M minimizing this calculated value is defined as the threshold.

Edges belonging to the intermediate luminance region are excluded at the step S7, and only edges belonging to the high luminance region or the low luminance region are adopted for the beginning telop decision. As a result, the precision of the beginning telop decision can be improved.

Figure 10:
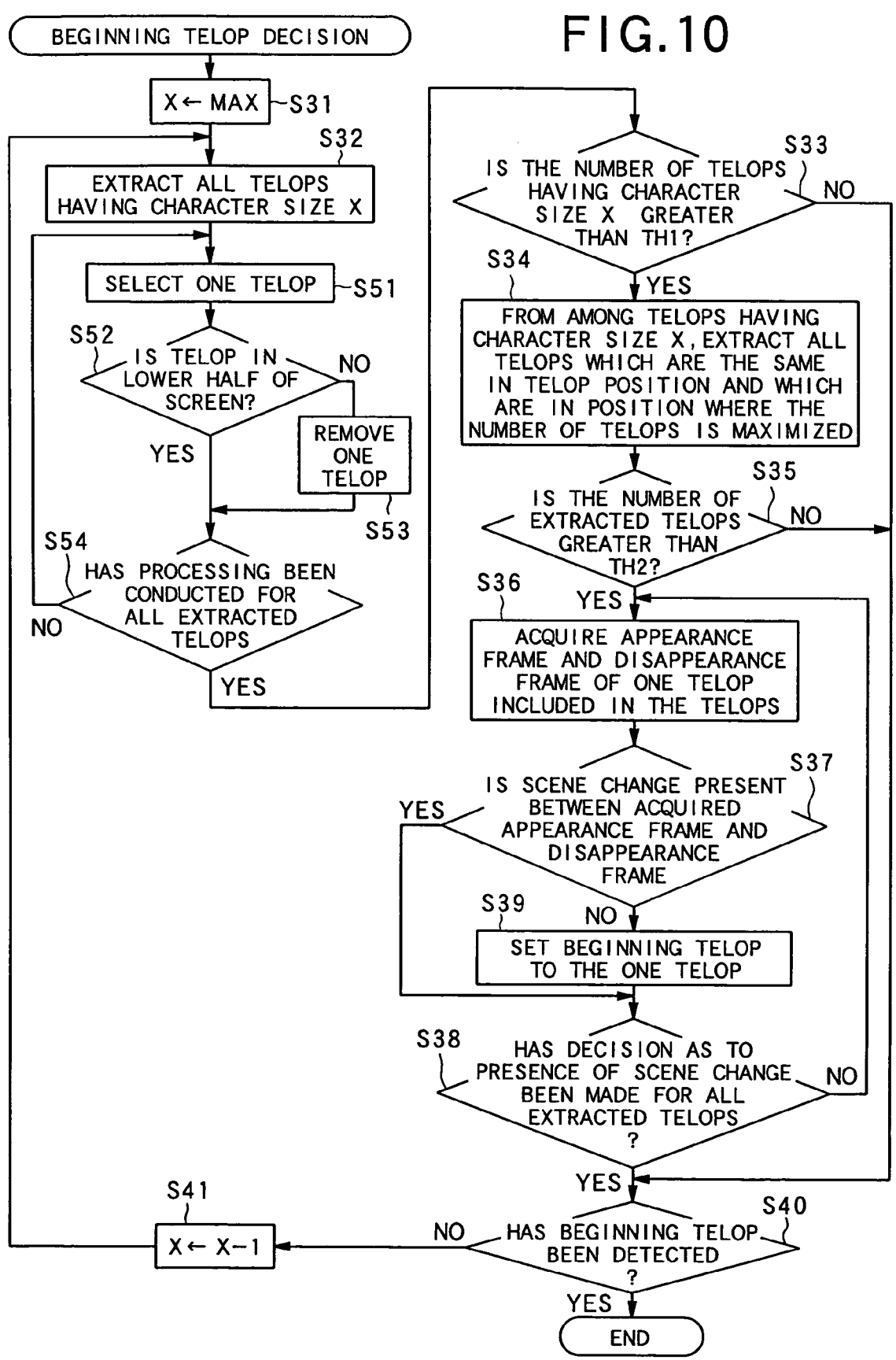
FIG. 10 is a flow chart showing a beginning telop decision operation as another embodiment of the present invention.

As for the beginning telop decision made by the beginning telop decision section 5, a condition (e) that the beginning telop appears in a lower part of the screen may be further added to the four conditions (a) to (d). FIG. 10 shows the beginning telop decision operation conducted by the beginning telop decision section 5 when the condition (e) is added. At the step S32, all telops having the character size X are extracted from the telop information detected by the telop detection section 3. Subsequently, one telop is selected from among the telops (step S51). A decision is made whether the selected one telop is located in a lower half range of the screen (step S52). At the step S52, the decision is made by obtaining a telop position from telop information concerning the one telop. If the one telop is not located in the lower half range of the screen, the one telop is removed from the telops extracted at the step S32 (step S53) and subsequently the processing proceeds to step S54. If the one telop is located in the lower half range of the screen, the processing immediately proceeds to the step S54. At the step S54, it is determined whether processing has been conducted for all telops extracted at the step S32. In other words, it is determined whether the decision at the step S52 has been made on all extracted telops. If the processing for all extracted telops has not been finished, the processing returns to the step S51 and one new telop is selected from among remaining telops. If the processing for all extracted telops has been finished, operation of the step 33 and subsequent steps is conducted for the telops which are extracted at the step S32 and which remain without being removed at the step S53.

By thus adding the condition that the beginning telop appears in the lower part of the screen to the beginning telop decision, the precision of the beginning telop decision can be further improved.

At the step S52, the lower part of the screen is defined as the lower half range of the screen. Alternatively, the lower part of the screen may also be, for example, a lower one-third range of the screen.

Figure 11:
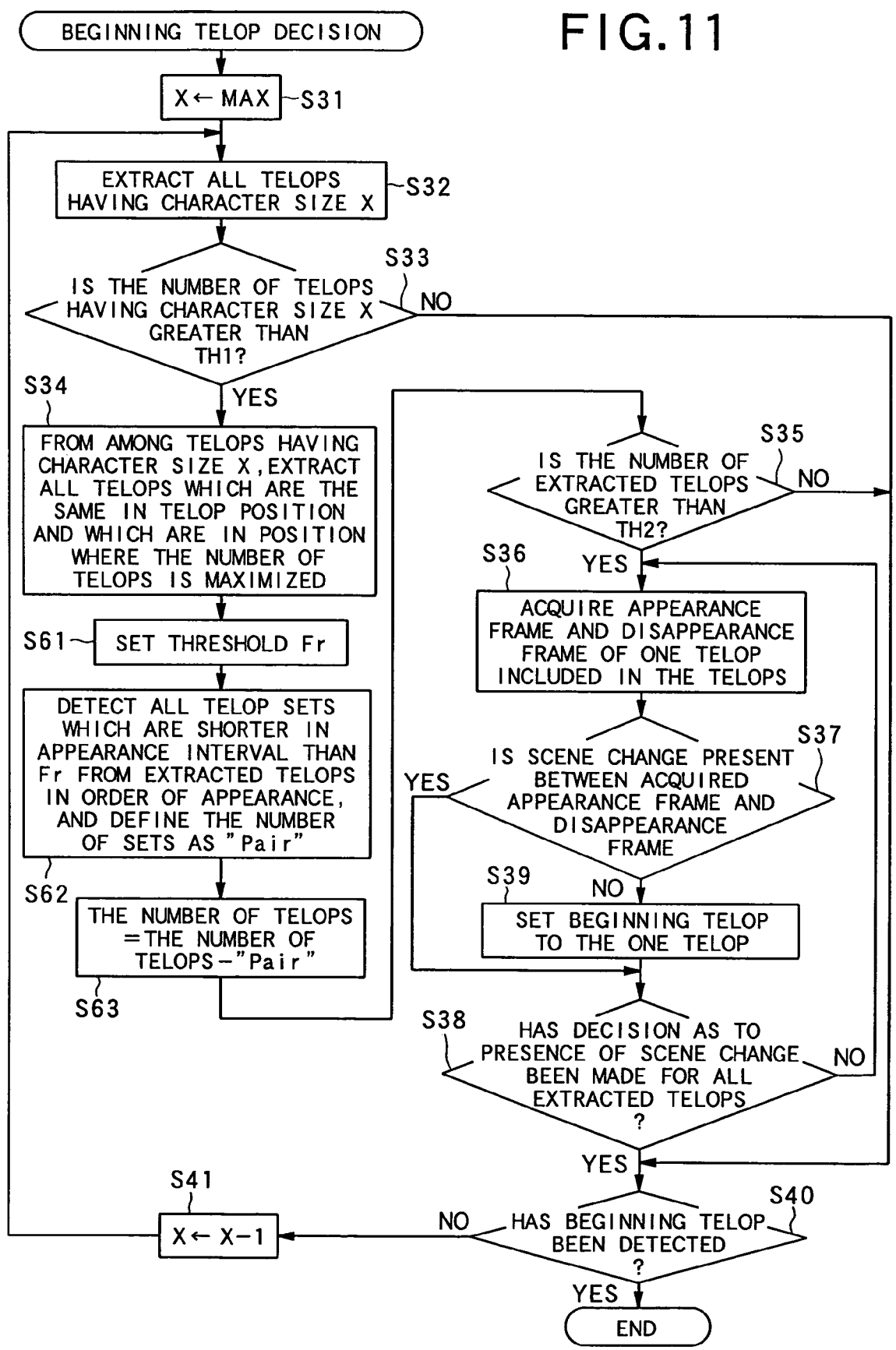
FIG. 11 is a flow chart showing a beginning telop decision operation as another embodiment of the present invention.

As for the beginning telop decision made by the beginning telop decision section 5, a condition (f) that telops appearing at short time intervals are not beginning telops may be further added to the four conditions (a) to (d). That is, the condition (f) is that beginning telops appear at long time intervals. FIG. 11 shows the beginning telop decision operation conducted by the beginning telop decision section 5 when the condition (f) is added. At the step S34, from among the telops having the character size X, all telops which are the same in telop position and which are in a position where the number of telops is maximized are extracted. Subsequently, a frame threshold Fr is set with respect to the extracted telops (step S61). The frame threshold Fr is set on the basis of typical beginning telop appearance interval, and it is, for example, one minute. As for the frame threshold Fr, its initial value may be used as it is without being set at the step S61. After execution of the step S61, telop sets which are shorter in appearance interval than the frame threshold Fr are detected from the extracted telops in the order of telop appearance, and the number "Pair" of telop sets is found (step S62). For example, if a second telop appears after disappearance of a first telop, the appearance interval is detected on the basis of the number of difference frames between a disappearance frame of the first telop and an appearance frame of the second telop. All telop sets which are shorter in appearance interval than the frame threshold Fr are detected, and the number of all detected telop sets is the "Pair." After execution of the step S62, the number of telop sets "Pair" is subtracted from the number of extracted telops and a result of the calculation is defined as the number of telops (step S63). Furthermore, from among the telops extracted at the step 34, telops later in time than a telop set which is shorter in appearance interval than the frame threshold Fr are removed. Operation of the step S35 and subsequent steps is conducted on telops obtained after the removal.

In the case of news programs, it is ordinary that after one beginning telop has disappeared a detailed scene concerning the beginning telop is displayed. Therefore, beginning telops appear at time intervals of some degree. By adding the condition that telops appearing at short time intervals are not beginning telops to the beginning telop decision, the precision of the beginning telop decision can be further improved.

Figure 12:
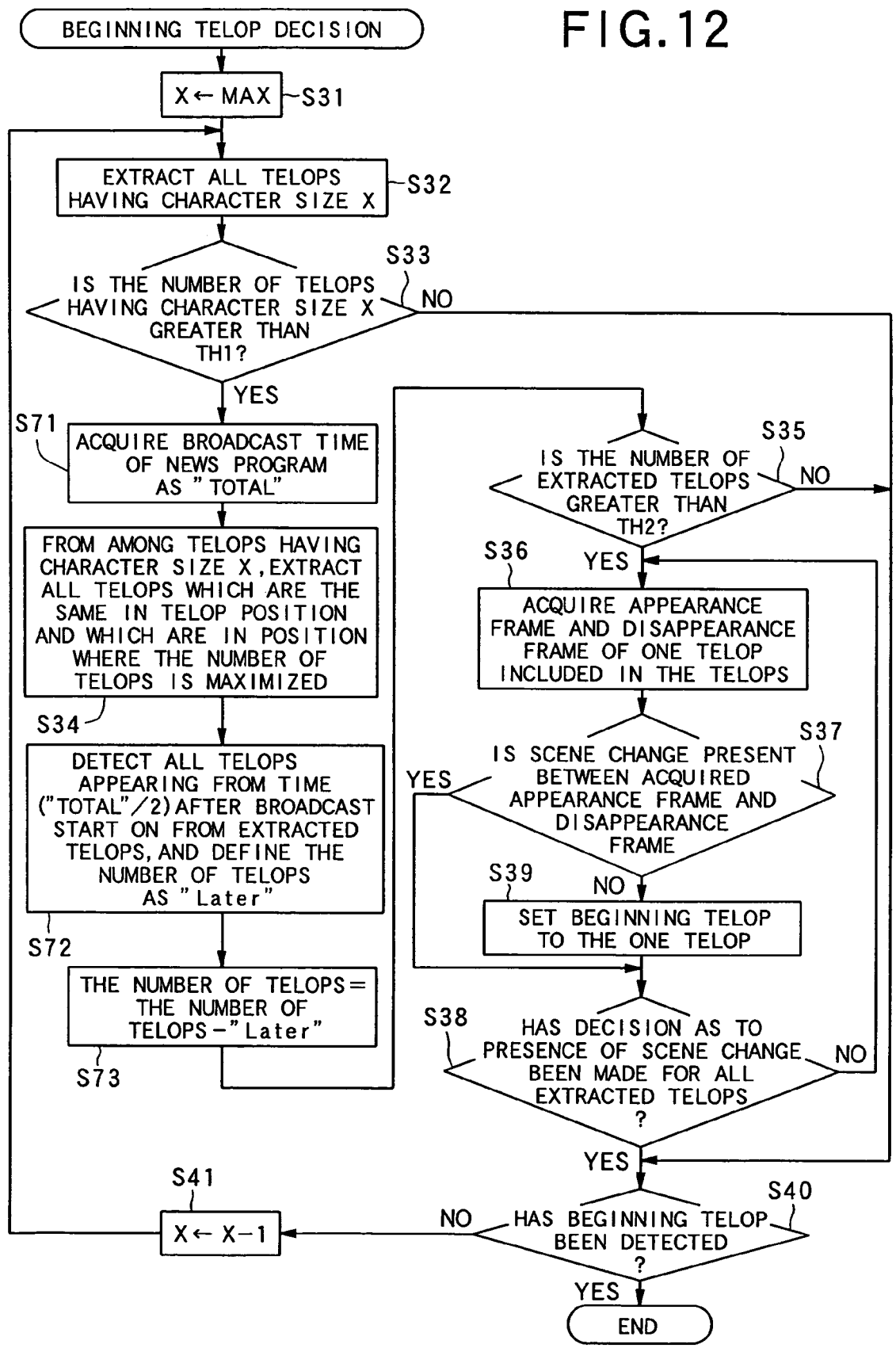
FIG. 12 is a flow chart showing a beginning telop decision operation as another embodiment of the present invention.

As for the beginning telop decision made by the beginning telop decision section 5, a condition (g) that telops appearing in the former half of the news program are defined as beginning telops may be further added to the four conditions (a) to (d). FIG. 12 shows the beginning telop decision operation conducted by the beginning telop decision section 5 when the condition (g) is added. First, broadcast time of a subject news program in which beginning telops are to be judged is acquired as "TOTAL" (step S71). This can be obtained from the above-described program information. After execution of the step S71, the character size X is set to a maximum value MAX in the same way as the beginning telop decision operation shown in FIG. 6 (step S31). In addition, all telops which are the same in telop position and which are in a position where the number of telops is maximized are extracted. Subsequently, all numbers "Later" of telops appearing in the latter half of the broadcast time "TOTAL" (beginning at "TOTAL"/2 after the start of broadcast) are acquired (step S72). After execution of the step S72, the number "Later" of telops is subtracted from the number of extracted telops and a result of the calculation is defined as the number of telops (step S73). Furthermore, from the telops extracted at the step S34, telops appearing in the latter half of the broadcast time "TOTAL" are removed, and operation of the step S35 and subsequent steps is conducted for telops left after the removal.

As for the configuration of a news program, typically the former half includes ordinary news and the latter half includes other items (such as a special edition, sports and a weather forecast). Therefore, the possibility that the beginning telop will appear in the former half of the news program inevitably becomes high. By adding the condition that a telop appearing in the former half of the news program is defined as a beginning telop to the beginning telop decision, the precision of the decision of the beginning telop can be further improved.

At the step S72, in order to find the number "Later" of telops appearing in the latter half of the news program, the latter half is defined to start when the time "TOTAL"/2 has elapsed since the broadcast start of the news program. However, this is not restrictive. The number "Later" of telops appearing in the latter half may also be found, defining the latter half to start when the thirty minutes have elapsed since the broadcast start of the news program.

Furthermore, as for a long-time news program in the early morning, beginning telop detection may be conducted by dividing the time into parts. For example, a news program broadcasted in the early morning such as between 5 a.m. and 8 a.m. has a long broadcast time such as two to three hours. In that program, the telop configuration (such as the background of the studio and the pattern around the telop) is changed slightly every several tens minutes, and similar news items are broadcasted repetitively. As for a news program having such a long time, the precision of the beginning telop decision can be further improved by dividing the broadcast time every constant time (for example, one hour) and conducting the beginning telop detection in each of resultant time zones.

As in the above-described embodiments, a beginning telop is extracted from a frame including the beginning telop and used as an item of the chapter menu. Therefore, heavy-load processing such as character recognition, image recognition and speech recognition is not needed. In implementing the chapter menu display, therefore, resources can be held down. Furthermore, even if the configuration of a news program differs, it can be coped with.

Figure 7:
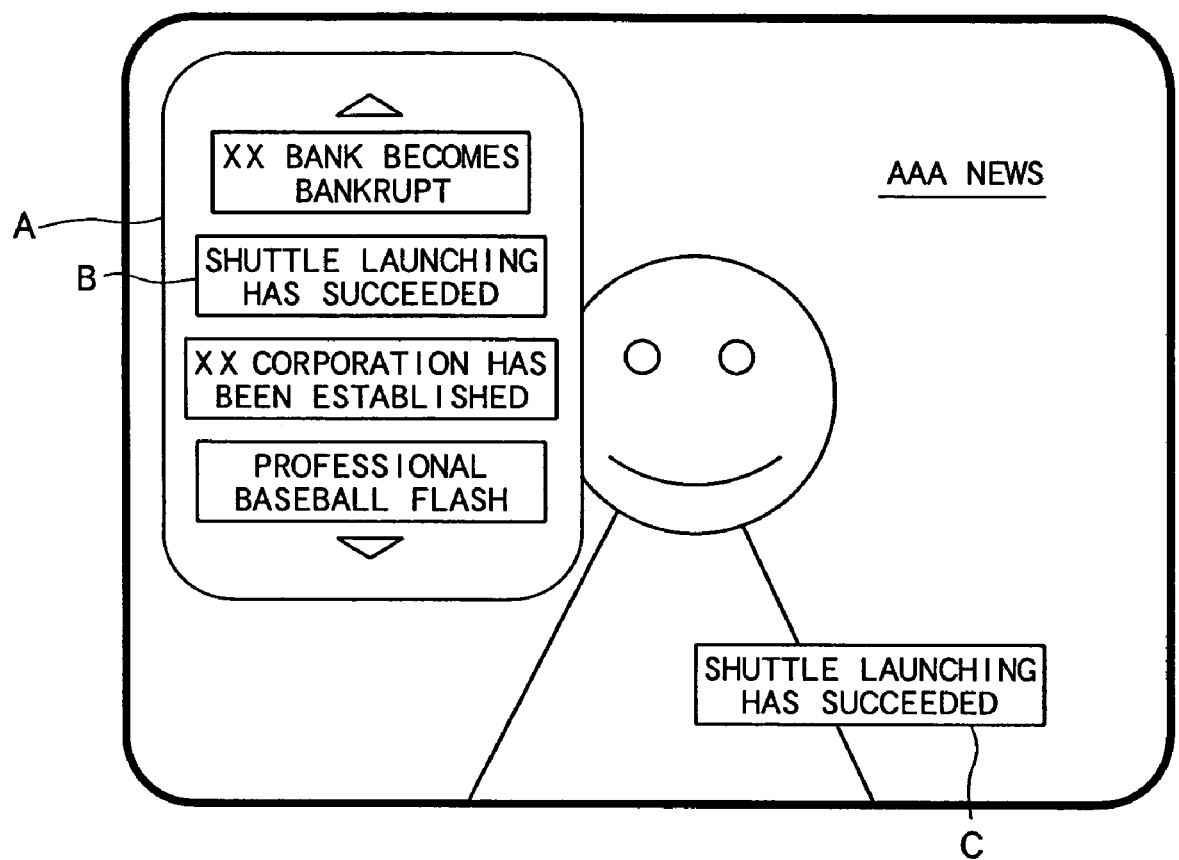
FIG. 7 is a diagram showing a monitor view including a chapter menu.

Furthermore, as for items in the chapter menu, images indicated by image data of only the beginning telop portion are contracted and used. Therefore, a plurality of items can be displayed in the menu as shown in FIG. 7. Furthermore, even if the images are contracted to a relatively small size, it is possible to facilitate recognition of respective items.

In the above described embodiments, the case where the genre of the broadcast program is news has been described. However, this is not restrictive. The present invention can be applied to broadcast programs of other genres such as sports programs and song programs. For example, in television broadcast of sumo wrestling, ring names of fighting sumo wrestlers are displayed as telops. Therefore, each fight can be displayed as a menu by detecting the telops in the same way as the above-described embodiments.

Furthermore, the embodiments have been described supposing that a predetermined feature image portion of each frame in the video signal of the news program is a telop. This is not restrictive, either. The predetermined feature image portion may be a still image. The predetermined feature image portion may be an image of a face of a specific person. By using a face recognition apparatus, which recognizes a person on the basis of a contour of a face and a position relation among eyes, a nose and a mouth, a face image of a specific person can be extracted.

As heretofore described, the apparatus according to the present invention includes a genre decision device which makes a decision whether the broadcast program having a video signal in a storage device is a broadcast program of a predetermined genre, a feature image detection device which detects a predetermined feature image portion of each of frames in the video signal of the broadcast program of the predetermined genre from the video signal stored in the storage device, a video extraction device which extracts video data of only a feature image portion of a frame satisfying a predetermined appearance condition from the predetermined feature image portion detected by the feature image detection device, and a menu creation device which creates and outputs a video signal representing an image including a feature image portion represented by video data as the menu, each time video data is extracted by the video extraction device. Therefore, a menu representing contents of the broadcast program can be created automatically. Furthermore, the present invention can be applied to a video recording apparatus such as a hard disk recorder.

Incidentally, for example, a video storage section 1 according to this embodiment serves as a storage device according to the present invention, and a genre decision section 2 according to this embodiment serves as a genre decision device according to the present invention. A telop detection section 3 according to this embodiment serves as a telop detection device according to the present invention, and the telop detection device includes a feature image detection device, an edge region detection device, an edge detection device, and a telop decision device according to the present invention. A scene change detection section 4 and a beginning telop decision section 5 according to this embodiment serve as a video extraction device according to the present invention. The scene change detection section 4 according to this embodiment serves as a scene detection device, a luminance average calculation device, and a judging device according to the present invention, and the beginning telop decision section 5 according to this embodiment serves as a character size setting device, a first decision device, a second decision device, a third decision device, a fourth decision device, a fifth decision device, and a sixth decision device according to the present invention. A chapter menu creation section 6 according to this embodiment serves as a menu creation device according to the present invention, and a user interface section 7 according to this embodiment serves as an operation device according to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-306780 filed on Aug. 29, 2003 including the specification, claims, drawings and summary is incorporated herein by reference in its entirety.

The entire disclosure of Japanese Patent Application No. 2003-136908 filed on May 15, 2003 including the specification, claims, drawings and summary is incorporated herein by reference in its entirety.

What is claimed is:

1. A news broadcast program contents menu creation apparatus which creates a menu concerning contents of a news broadcast program including a telop, the news broadcast program contents menu creation apparatus comprising:

a storage device which stores a video signal of the news broadcast program;
a telop detection device which detects the telop of each of frames in the video signal of the news broadcast program of the predetermined genre from the video signal stored in the storage device;
a video extraction device which extracts video data of only the telop satisfying a predetermined appearance condition out of a plurality of telops detected by the telop detection device; and
a menu creation device which creates and outputs a video signal representing an image including the telop represented by video data as the menu, each time video data is extracted by the video extract device, wherein
the video extraction device comprises a scene detection device which detects a frame at a point in time where a scene changes in a series of frames of a video signal stored in the storage device, and
the predetermined appearance condition is to satisfy all of following conditions:
condition (a): character sizes are larger than a predetermined size, and are constant for respective news items;
condition (b): a telop appears a plurality of times in one news program;
condition (c): a beginning telop appearing in a first scene of each news item is disposed in the same position every time; and
condition (d): between the appearance and the disappearance of the beginning telop, there are no scene changes.

2. The broadcast program contents menu creation apparatus according to claim 1, wherein the telop detection device comprises:
an edge region detection device which detects an edge-surrounded region surrounded by portions having a high luminance difference between adjacent pixels in each of frames in the video signal of the news program from the video signal stored in the storage device; and
a telop decision device which judges an edge-surrounded region detected by the edge region detection device to be a telop when the edge-surrounded region is the same region over consecutive frames that are more than a predetermined number of frames, and supplies telop information including an appearance frame, a disappearance frame, a telop position, and a character size of the telop to the video extraction device.

3. The broadcast program contents menu creation apparatus according to claim 2, wherein the edge region detection device comprises an edge detection device which detects edges formed by pixels included in the edge pixels having high luminance difference and having luminance other than intermediate luminance, and the edge region detection device detects the edge-surrounded region on the basis of the edges detected by the edge detection device.

4. The broadcast program contents menu creation apparatus according to claim 3, wherein the edge detection device creates a luminance histogram for edge pixels every frame in the video signal, classifies edge pixels into three luminance groups of a low luminance group, an intermediate luminance group, and a high luminance group according to the luminance histogram, and detects edges formed by pixels having the low luminance or high luminance on the basis of a result of the classification.

5. The broadcast program contents menu creation apparatus according to claim 1, wherein the video extraction device comprises:
a character size setting device which sets a character size of a telop;
a first decision device which judges the condition (a) and the condition (b) to be satisfied, when the number of telops included in the telops detected by the telop detection device and including characters having the character size set by the character size setting device is greater than a first predetermined number;
a second decision device which judges the condition (c) to be satisfied, when all telops are detected which are the same in telop position and which are in a position where the number of telops is maximized, from the telops satisfying the condition (a) and the condition (b), and when the number of the detected telops is greater than a second predetermined number; and
a third decision device which judges the condition (d) to be satisfied, when a scene change is not detected by the scene detection device in an interval ranging from an appearance frame to a disappearance frame of the same telop included in telops satisfying the condition (c).

6. The broadcast program contents menu creation apparatus according to claim 5, wherein when the first decision device has judged the number of telops included in the telops detected by the telop detection device and having characters of the set character size is equal to or less than the first predetermined number, when the second decision device has judged the number of telops in the position where the number of telops is maximized is equal to or less than the second predetermined number, or when the third decision device has judged that a scene change has been detected by the scene detection device in an interval ranging from the appearance frame to the disappearance frame, the character size setting device decreases the character size of the telop by one size and causes the first decision device to execute the decision operation again.

7. The broadcast program contents menu creation apparatus according to claim 5, wherein the character size setting device sets the initial value of the character size to its maximum value.

8. The broadcast program contents menu creation apparatus according to claim 1, wherein the predetermined appearance condition comprises a condition (e) that a beginning telop is located in a lower part of a screen corresponding to one frame, besides the conditions (a) to (d).

9. The broadcast program contents menu creation apparatus according to claim 8, wherein
the video extraction device comprises a fourth decision device which judges the condition (e) to be satisfied when a telop detected by the telop detection device is located in a lower part of the screen corresponding to one frame, and
the first decision device makes a decision whether a telop judged by the fourth decision device satisfies the condition (a) and the condition (b).

10. The broadcast program contents menu creation apparatus according to claim 1, wherein the predetermined appearance condition comprises a condition (f) that a beginning telop appears at long time intervals, besides the conditions (a) to (d).

11. The broadcast program contents menu creation apparatus according to claim 10, wherein
the video extraction device comprises a fifth decision device which judges a telop to satisfy the condition (f), when the telop that satisfies the condition (a) and the condition (b) appears at long time intervals; and
the second decision device makes a decision whether a telop judged by the fifth decision device satisfies the condition (c).

12. The broadcast program contents menu creation apparatus according to claim 1, wherein the predetermined appearance condition comprises a condition (g) that a beginning telop appears in a former half of a news program, besides the conditions (a) to (d).

13. The broadcast program contents menu creation apparatus according to claim 12, wherein
the video extraction device comprises a sixth decision device which judges a telop to satisfy the condition (g), when the telop that satisfies the condition (a) and the condition (b) appears in a former half of a news program, and
the second decision device makes a decision whether the telop judged by the sixth decision device satisfies the condition (c).

14. The broadcast program contents menu creation apparatus according to claim 1, wherein the video extraction device conducts detection of a frame including a telop which satisfies the predetermined appearance condition, by dividing a longtime news program every fixed time.

15. The broadcast program contents menu creation apparatus according to claim 1, wherein the scene detection device comprises:
a luminance average calculation device which calculates a luminance average value of each of frames in a video signal of a news program included in a video signal stored in the storage device; and
a judging device which judges a video signal to be between frames at a point in time where a scene changes, when a difference in luminance average value between consecutive frames in the video signal of the news, program is greater than a predetermined value.

16. The broadcast program contents menu creation apparatus according to claim 1, further comprising an operation device which selects any one item from among display items in the menu,
wherein the menu creation device takes out a video signal ranging from an appearance frame to at least a disappearance frame of the predetermined feature image portion corresponding to one item selected by the operation device, from the storage device, and mixes the video signal with a video signal representing the menu.

17. The broadcast program contents menu creation apparatus according to claim 1, wherein the menu creation device uses data obtained by contracting a feature image portion represented by the video data, as the video signal representing the menu.

18. A news broadcast program contents menu creation method which creates a menu concerning contents of a news broadcast program including a telop, the news broadcast program contents menu creation method comprising processes of:
storing a video signal of the news broadcast program in a storage device;
detecting the telop of each of frames in the video signal of the news broadcast program from the stored video signal;
extracting video data of only the telop satisfying a predetermined appearance condition out of a plurality of telops; and
creating and outputting a video signal representing an image including the telop represented by the video data as the menu, each time the video data is extracted, wherein
the extracting video data comprises scene detecting which detects a frame at a point in time where a scene chances in a series of frames of a video signal stored in the storage device, and
the predetermined appearance condition is to satisfy all of following conditions:
condition (a): character sizes are larger than a predetermined size, and. are constant for respective news items;
condition (b): a telop appears a plurality of times in one news program;
condition (c): a beginning telop appearing in a first scene of each news item is disposed in the same position every time; and
condition (d): between telop appearance and the disappearance of the beginning telop, there are no scene changes.

* * * * *